United States Patent [19]

Acampora

[11] Patent Number: 4,482,916

[45] Date of Patent: Nov. 13, 1984

[54] AUTOMATIC COLOR CONTROL FOR A DIGITAL TELEVISION RECEIVER

[75] Inventor: Alfonse Acampora, Staten Island, N.Y.

[73] Assignee: RCA Corporation, New York, N.Y.

[21] Appl. No.: 437,825

[22] Filed: Oct. 29, 1982

Related U.S. Application Data

[63] Continuation-in-part of Ser. No. 394,839, Jul. 2, 1982, abandoned.

[51] Int. Cl.$^3$ ............................................. H04N 9/535
[52] U.S. Cl. ....................................... 358/27; 358/35; 358/40
[58] Field of Search ......................... 358/27, 40, 35, 37

[56] References Cited

U.S. PATENT DOCUMENTS 3,732,358  5/1973  Harwood ..................... 178/5.4 AC
3,962,723  6/1976  Srivastava ........................... 358/27

FOREIGN PATENT DOCUMENTS 51075    5/1982  European Pat. Off. .
2854236  6/1980  Fed. Rep. of Germany .
2038138  7/1980  United Kingdom .

OTHER PUBLICATIONS

T. Fischer, "Fernsehen Wire Digital", *Elektronik*, 1981, pp. 27–35.

*Primary Examiner*—Tommy P. Chin
*Attorney, Agent, or Firm*—E. M. Whitacre; P. J. Rasmussen; C. A. Berard, Jr.

[57] ABSTRACT

An automatic color control (ACC) for a digital television receiver is compatible with and is unaffected by variation of the phase of the color subcarrier signal introduced in demodulating the color subcarrier to effect control of tint. ACC is effectuated by digital gain control for scaling the digital words representing the sampled magnitudes of the color subcarrier burst signal. Quadrature demodulation of the color subcarrier produces color signal digital words I and Q which are each sampled and latched during the color subcarrier burst. The sampled digital words are each squared and are then summed together. The summed digital word is compared to a chroma reference digital word and the difference digital word is employed to scale the color subcarrier digital words.

15 Claims, 12 Drawing Figures

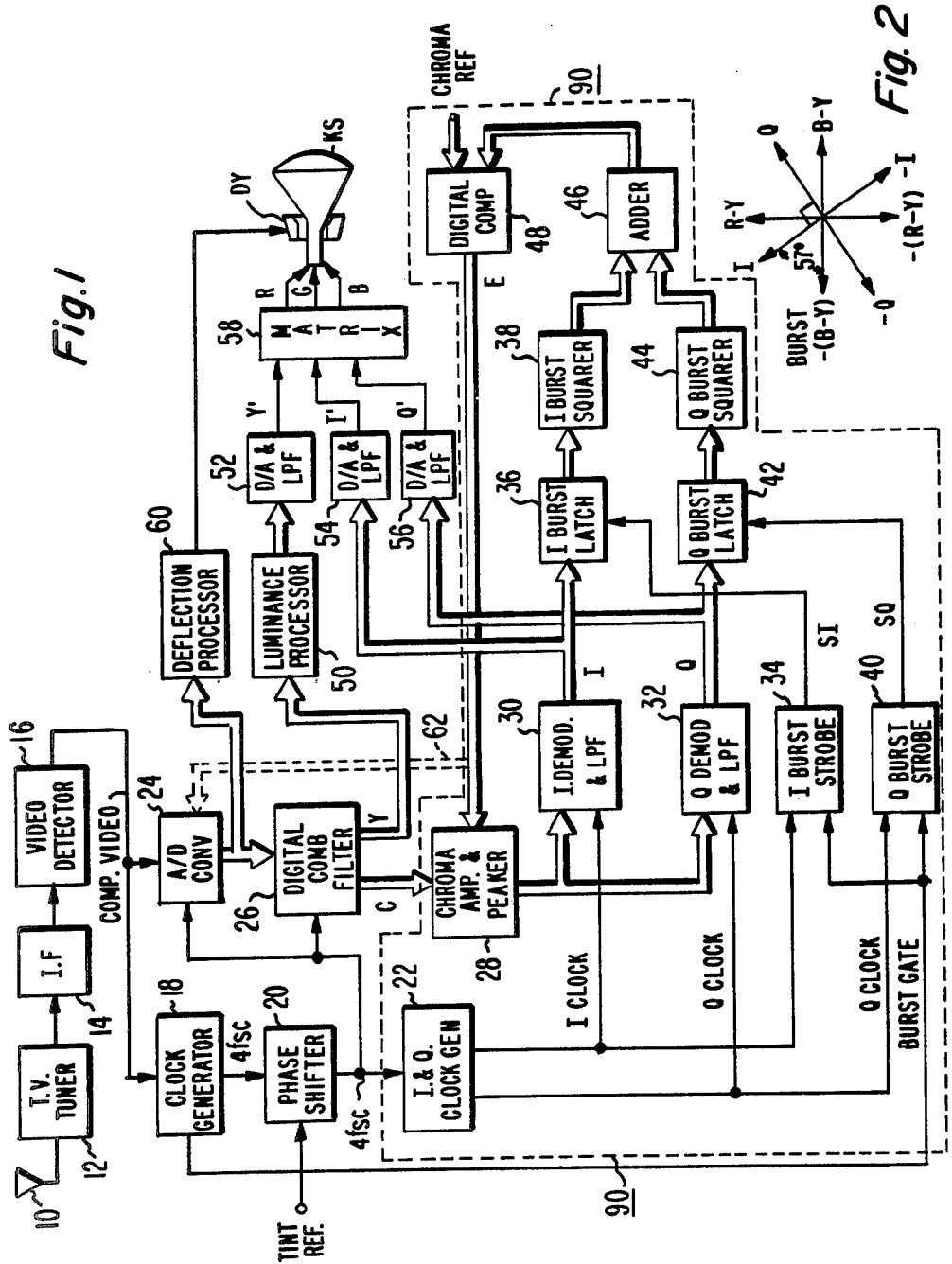

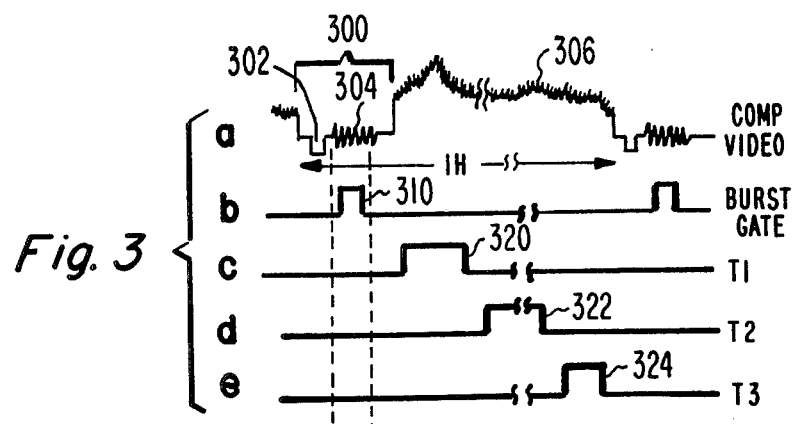
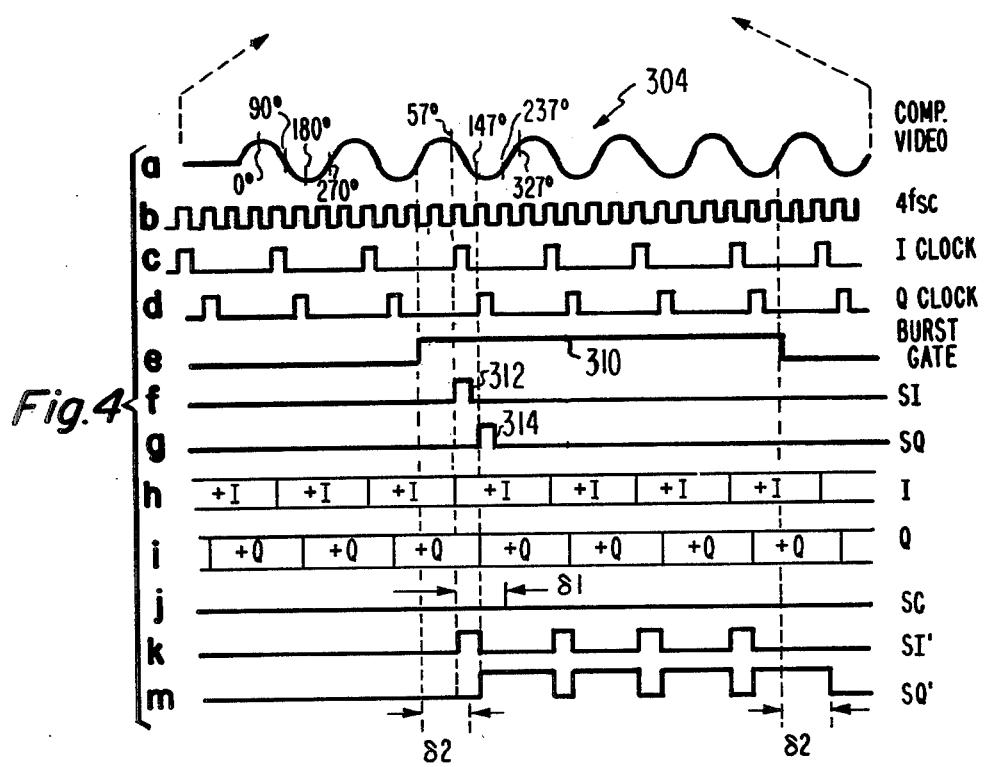

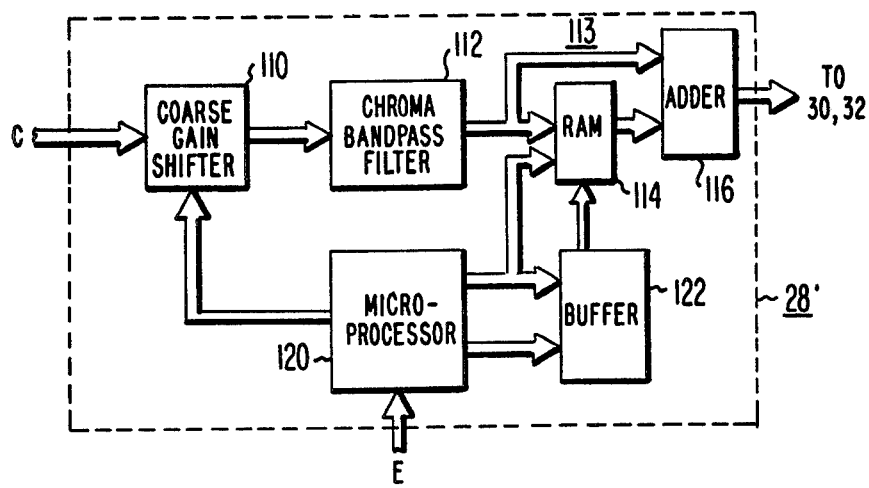
Fig.5
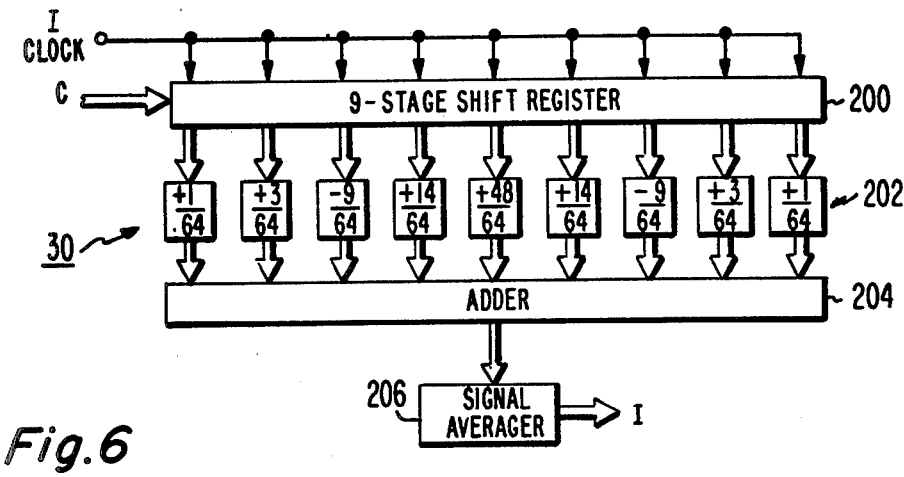
Fig.6
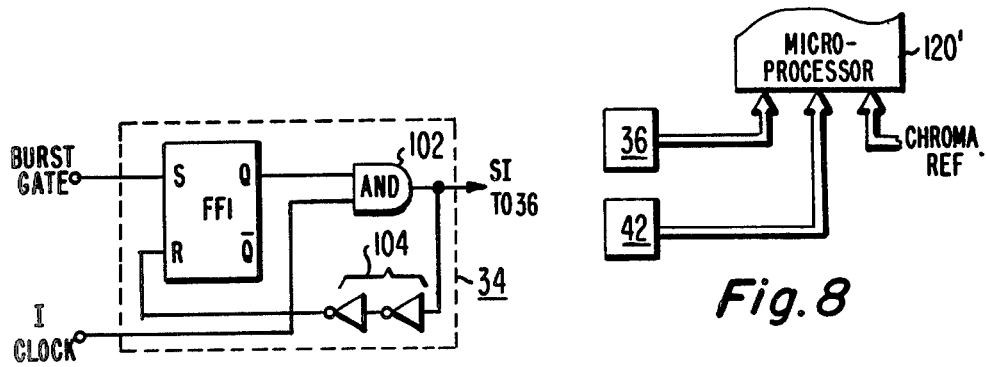
Fig.7
Fig.8

AUTOMATIC COLOR CONTROL FOR A DIGITAL TELEVISION RECEIVER

This is a continuation-in-part of U.S. patent application Ser. No. 394,839, filed on July 2, 1982, which is abandoned subsequent to the filing hereof.

The present invention relates to automatic color control for a digital television receiver and, in particular, to digital chroma gain control apparatus.

In digital television (TV) receivers, an analog video signal, for example, the baseband video signal, is sampled and the samples converted to representative digital samples by an analog-to-digital (ADC) converter. The digital samples are processed in a digital comb filter to produce digital samples representing separated luminance and chrominance information. The digital luminance and chrominance samples are processed in respective channels of a digital signal processing section which perform functions similar to those performed by analog luminance and chrominance channels found in presently commercially available television receivers. Finally, the digital samples produced by the luminance and chrominance channels of the digital signal processing section are converted into analog signals representing image display information. The conversion is performed by digital-to-analog converters (DAC) the outputs of which are coupled to a kinescope in conventional fashion.

In order that the digital samples generated by the analog-to-digital converter accurately represent the analog baseband video signal, the Nyquist sampling criteria requires that the frequency at which the analog baseband signal is sampled must be at least twice the highest frequency of interest of the analog baseband video signal. Because it is desirable that the sampling signal be consistently related in phase to the analog baseband video signal in order not to introduce distortion in the reproduced image, the sampling signal is derived from the color reference burst signal component of the baseband video signal. The frequency of the color reference burst signal is usually referred to as the color subcarrier frequency $f_{sc}$. Thus, the sampling signal may be derived by an arrangement which extracts the color reference burst component from the baseband video signal and a phase-locked loop (PLL) which locks an oscillator to an integer multiple of the subcarrier frequency $f_{sc}$ of the reference burst signal.

By way of example, in the NTSC system used in the United States, the highest baseband video signal frequency of interest is around 4.2 MHz and the color subcarrier frequency $f_{sc}$ is approximately 3.58 MHz. Accordingly, the lowest sampling signal frequency at an integer multiple of the color burst signal which satisfies the Nyquist criterion is $3f_{sc}$. Because demodulation of color burst signals, as described below, can more readily be realized when the sampling signal is an even multiple of the color subcarrier frequency, the most often proposed sampling frequency is $4f_{sc}$ (approximately 14.32 MHz).

One function performed by the chrominance channel of the digital signal processing section is color demodulation by which the digital chrominance samples occurring at times corresponding to predetermined phase angles of the color reference burst component associated with respective color demodulation color reference vectors are selected and provided at respective outputs. The resultant digital samples can then be used to produce color signals for determining the color content of the reproduced image.

Typically, the color reference vectors chosen for color demodulation correspond either to the 0° and 90° phase points or to the 57° and 147° phase points with respect to the color reference burst signal. The former are commonly referred to as the —(B—Y) and (R—Y) color reference vectors and the latter are commonly referred to as the I and Q color reference vectors. It is more desirable to perform color demodulation with respect to the I and Q color reference vectors, rather than with respect to the —(B—Y) and (R—Y) color reference vectors, because signals corresponding to the I color reference vector have a relatively broad freqency range. In addition, the human eye is more sensitive to such signals because the I signal corresponds to flesh tones.

It is desirable that the chrominance channel of the digital signal processing section be responsive to user controls for adjusting the tint or hue of the reproduced image as desired. In one digital color demodulator including provisions for tint control, color demodulation is accomplished by aligning the phase of the sampling signal so that samples are produced by the A/D converter at times corresponding to the phase angles of the color burst signal associated with the I, Q, —I and —Q color reference vectors. The samples which occur at times corresponding to the I and Q color reference vectors are selectively demodulated and provided at respective I and Q outputs. Tint control is accomplished by adjusting the phase angle of the sampling signal relative to the phase of the color reference burst signal.

Another function performed by the chrominance channel of the digital signal processing section is controlling the amplitude of the digital chrominance signals. Amplitude control is performed automatically, to set the amplitude of the color signals in a range suitable for digital processing, and manually in response to user controls, to set the color level to that desired by a user. In one such apparatus, the automatic color control apparatus includes a burst sampler which examines the peak magnitude of digital chrominance channel samples which occur during the color burst interval. The peak digital chrominance burst samples are compared to a digital reference level to generate a color amplitude control signal. Advantageously, for this purpose, the phase of the sampling signal is aligned so that digital samples corresponding to the peaks of the color burst signal are available in order to obtain the highest possible amplitude for the samples and therefore improve the noise performance of the system. The peaks of the color burst signal occur at 360° multiples of the 0° phase point thereof which corresponds to the —(B—Y) color reference vector.

Unfortunately, the desire to perform color demodulation with respect to the I and Q color reference vectors is not consistent with the desire to produce digital samples corresponding to the —(B—Y) color reference vector for the purpose of chrominance gain control. While (R—Y) and —(B—Y) values can be readily derived from the I and Q color reference vectors, that is not so readily done when the phase of the sampling signal is variable to accomplish tint control.

Thus, there is a need for a digital color television signal processing system including an arrangement for determining the amplitude of the color burst signal for the purpose of chrominance gain control which is not disturbed by the phase of the sampling signal being varied for the purpose of tint control.

In accordance with the present invention, a digital chroma gain control apparatus is provided for a television system wherein the magnitude of a digital chroma reference burst component of sampled digital chroma signals is determined from first and second digital chroma reference signals which are in quadrature with respect to each other. Specifically, first and second digital chroma reference signals are produced by sampling the chroma reference burst component of the digital chroma signals and a digital sum indicative of the magnitude of the sum of the respective squares of the magnitudes of the first and second digital chroma reference signals is developed.

A chroma control signal is produced in response to the digital sum signal departing from a predetermined value for causing a processing device to scale the chroma signals to have a predetermined magnitude.

In the drawing:

FIG. 1 shows a digital television receiver in block diagram form including an embodiment of the present invention;

FIG. 2 shows a vector diagram useful in understanding the operation of the digital television receiver shown in FIG. 1;

FIGS. 3 and 4 show signal waveforms useful in understanding the operation of the digital television receiver shown in FIG. 1; and FIGS. 5, 6, 7, 8, 9, 10, 11 and 12 show in block diagram form or in logic diagram form implementations of various portions of the digital television receiver shown in FIG. 1.

Figure 9:
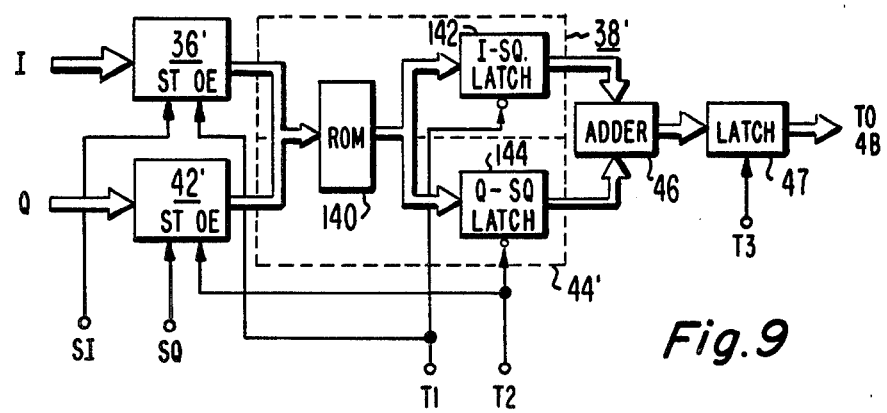

As shown in the FIGURES herein, the broad arrows represent digital data connections for passing digital words having eight bits in parallel, unless a different arrangement is specified.

In the digital television receiver shown in FIG. 1, conventional television signals are received at antenna 10. A desired channel is selected and the signal corresponding thereto is converted to an intermediate frequency (IF) by television tuner 12. IF signal processor 14 supplies the IF signal to video detector 16 which develops a composite baseband video signal therefrom. Tuner 12, IF processor 14 and video detector 16 can be of conventional implementation as used in presently commercially available television receivers.

Timing signals for digital processing are developed by clock generator 18 in response to the composite video signal, one horizontal line (1H) of which is shown in FIG. 3a. Each horizontal line 1H includes a horizontal blanking interval 300 during which no image information is present. Horizontal blanking interval portion 300 includes horizontal synchronizing pulse 302 followed by a color subcarrier reference burst signal 304 including a minimum of eight cycles of the 3.58 MHz color subcarrier signal. The remaining portion 306 of horizontal line 1H provides image information in accordance with the NTSC standards in which the luminance (brightness) information is related to amplitude and in which the chrominance (color) information modulates the 3.58 MHz subcarrier. FIG. 2 shows the relative phases of the chroma reference vectors with the —(-B—Y) component being defined at 0° phase with respect to the positive peak of the chroma reference burst signal. The I component is retarded by 57° and is in quadrature with the Q component which is further retarded by 90°, i.e. at 147°. The —I and —Q components are 180° out of phase with the I and Q components, respectively. The R—Y, B—Y and —(R—Y) components are at 90°, 180° and 270° phase angles, respectively.

Clock generator 18 provides a burst gate signal shown in FIG. 3b which includes a pulse 310 of duration less than that of the color subcarrier reference burst signal 304 and which is positioned in time, for example, by predetermined delay after horizontal sync pulse 302. A phase-locked loop (PLL) included in clock generator 18 produces a clock signal at $4f_{sc}$ which is phase locked to the color subcarrier reference burst signal with phase correction being made during the time interval defined by pulse 310 of the burst gate signal. Phase lock is maintained by the PLL throughout the horizontal line 1H.

Phase shifter 20 provides advancement or retardation of the phase of the $4f_{sc}$ clock signal in relation to the phase of color subcarrier burst signal $f_{sc}$ in response to a tint reference signal which is manually adjustable by the user. In net result, the $4f_{sc}$ clock signal at the output of phase shifter 20 is shifted in phase relative to the phase of the color subcarrier reference burst signal $f_{sc}$ by 57° plus or minus the user introduced variation to control tint. In practice, it is unimportant whether the nominal 57° phase lag is provided by clock generator 18 or by phase shifter 20.

The composite video signal from video detector 16 is also applied to analog-to-digital converter 24 which also receives the $4f_{sc}$ clock signal and converts the analog baseband composite video signal to representative eight-bit digital samples at the $4f_{sc}$ sampling frequency. Each digital sample includes a group of eight bits representing the magnitude and polarity of the baseband video signal at the time the sample is taken. The eight-bit samples employed in the arrangement herein described provides satisfactory signal resolution. The present invention may be employed with arrangements which process digital words having greater or lesser numbers of bits.

Digital video samples from ADC 24 are coupled to digital comb filter 26 which produces digital samples Y representative of luminance information and digital samples C representative of chrominance information. Digital comb filter 26 includes, for example, a delay element comprising a 910-stage, eight-bit parallel shift register (not shown) to provide a 1H time delay in the NTSC system using the $4f_{sc}$ sampling frequency. The delayed digital samples produced at the output of the 910-stage shift register are combined with undelayed digital samples by an adder (not shown) to produce digital luminance samples (Y) and are combined by a subtractor (not shown) to produce digital chrominance samples (C).

Luminance processor 50 receives digital luminance samples Y and processes them in response to the $4f_{sc}$ sampling signal. The processed luminance digital signals are applied to digital-to-analog converter and low pass filter 52 to develop an analog luminance signal Y'.

Digital chrominance samples C are processed by chrominance processor 90, including chroma amplifier and peaker 28, I demodulator and low pass filter 30, and Q demodulator and low pass filter 32, to develop I and Q digital chroma signals. The operation of chroma processor 90 is described in detail below. The I and Q digital chrominance signals are applied to digital-to-analog converters and low pass filters 54 and 56, respectively, which produce analog chroma signals I' and Q', respectively.

Matrix 58 receives the analog luminance signal Y' and analog chroma signals I' and Q' and develops, in conventional fashion, red R, green G and blue B signals which are applied to kinescope KS. Deflection processor 60 produces horizontal and vertical deflection signals which are applied to kinescope deflection yoke DY in response to the synchronizing information encoded in the digital video samples produced by ADC 24. The raster produced on kinescope KS in response to the signals applied to deflection yoke DY cooperates with the R, G, and B signals to produce an image display on KS in conventional fashion.

Digital chrominance processor 90 of FIG. 1 operates in response to the sampling signal $4f_{sc}$ received from phase shifter 20 and the digital chrominance samples C received from comb filter 26. Sampling signal $4f_{sc}$ shown in FIG. 4b is nominally shifted by 57° with respect to the phase of reference burst signal 304 shown in FIG. 4a so as to occur at times corresponding to the I, Q, —I and —Q vectors, as shown in FIG. 2. It is noted that FIG. 4 depicts signal waveforms in a time interval within a portion of the horizontal blanking interval 300 of horizontal line 1H shown in FIG. 3; this time relationship is indicated by the phantom lines with arrowheads pointing between FIGS. 3 and 4. The timing signals shown in FIGS. 4b, 4c and 4d are present throughout the entire horizontal line 1H thereby producing a series of digital chroma samples I and Q shown in FIGS. 4h and 4i throughout each horizontal line 1H. The values of the I and Q samples will be zero during horizontal blanking interval 300 except during the portion thereof when color reference burst 304 is present. Picture information is not present during blanking interval 300 but is present during the remaining portion 306 of horizontal line 1H.

Digital chrominance samples C are processed by chroma amplifier and peaker 28, shown in detail in FIG. 5, which provides scaling of the magnitudes of chrominance samples C. Coarse gain shifter 110 comprises a controllable, eight-bit parallel shift register controlled by shift signals provided by microprocessor 120. The magnitude of chroma digital words C is increased in increments of 6 dB for each shift to the left by one bit position (e.g., to a more significant bit location) provided by gain shifter 110. Conversely, the magnitude of chroma sample C is decreased in increments of 6 dB for each shift to the right by one bit location. Chroma words produced at the output of gain shifter 110 are applied to chroma bandpass filter 112 which may comprise, for example, a finite impulse response (FIR) filter. Chroma samples from bandpass filter 112 are coupled to fine gain section 113 in which they are applied to the address inputs of random access memory (RAM) 114 and to one input of adder 116. RAM 114 is an eight-bit by 256 register memory. The output from RAM 114 is coupled to a second input of adder 116. The sum produced by adder 116 is then coupled to I demodulator 30 and Q demodulator 32 of FIG. 1.

In response to a gain error signal E, the generation of which is described in detail below, microprocessor 120 calculates the required gain and controls gain shifter 110 to produce the required number of shifts left or right to achieve the 6 dB gain increment next below the required scaling. Microprocessor 120 calculates a scaling factor having a value between one and two which will cause fine gain section 113 to exhibit the gain which, in combination with coarse gain shifter 110, produces the required gain. A table of scaling values comprising the RAM addresses times the scaling factor developed by microprocessor 120 is loaded into buffer register 122. Register 122 has 256 eight-bit register locations corresponding to the addressable registers of RAM 114. At the appropriate time, such as during the vertical blanking interval, microprocessor 120 enables RAM 114 to be loaded with the table of scaling values stored in buffer register 122.

For example, if the required gain is 14.5 dB, gain shifter 110 is controlled to produce two left shifts of the digital chroma samples C to provide a gain of +12 dB. The table of scaling values calculated for RAM 114 then corresponds to a scaling factor of one-third. Chroma samples C scaled by one-third by RAM 114, when added to the chroma samples C from bandpass filter 112 by adder 116, produce chroma samples scaled by a value of four-thirds, which corresponds to a gain of 2.5 dB. U.S. patent application Ser. No. 359,433 of Lewis, Jr. et al entitled DIGITAL TELEVISION RECEIVER AUTOMATIC CHROMA CONTROL SYSTEM is incorporated herein by reference for the purpose of providing a more detailed description of an embodiment of chroma amplifier and peaker 28 of the sort described herein.

I and Q clock generator 22 develops I clock and Q clock signals shown in FIGS. 4c and 4d, respectively, in response to sampling signal $4f_{sc}$. The I clock signal is at a high level at times corresponding to the I phase of the reference burst signal 304 and the Q clock signal is at a high level at times corresponding to the Q phase thereof. The I clock and Q clock signals are therefore in quadrature with each other and nominally at 57° and 147°, respectively, with respect to the phase of the color subcarrier signal $f_{sc}$ as is required for demodulation and sampling of the I and Q digital samples.

Digital chroma signals from chroma amplifier and peaker 28 are applied to I demodulator and low pass filter 30 shown in FIG. 6. Chroma samples C are applied to a nine-stage, eight-bit parallel shift register 200 and are shifted therethrough in response to the I clock signal applied to each stage thereof. The digital values of +I samples are stored in each of the nine stages of shift register 200 and are applied to corresponding ones of the nine weighting devices 202. Each weighting device 202 is, for example, a multiplier which multiplies the +I sample digital word applied at its input by the weighting value shown within the blocks in FIG. 6. The respective weighted digital values from weighting devices 202 are summed by a nine-input, eight-bit adder 204 and are applied to signal averager 206. Averager 206 may simply be a latch to avoid producing erroneous I values during the time required for multipliers 202 and adder 204 to settle. This arrangement 30 provides low pass filtering to produce demodulated digital chroma signals I, Q demodulator and low pass filter 32 is implemented similarly to the I demodulator and low pass filter 30 just described except that its shift register is clocked by the Q clock and its output signal is the demodulated digital chroma signal Q. Digital chroma signals I and Q, shown in FIGS. 4h and 4i, comprise respective series of eight-bit digital words representing the +I sample values, and the +Q sample values. The value of each digital word is unchanged during the time intervals defined between the vertical dividing lines in FIGS. 4h and 4i corresponding in time with the I clock and Q clock signals.

The digital values of the I and Q samples occuring during the reference burst signal 304 are employed for automatically controlling the chrominance processor gain. This sampling interval corresponds to the duration of burst gate pulse 310 which is selected to include a number of the at least eight cycles of the reference burst signal 304, but excluding at least the first and last cycle thereof. This exclusion avoids error which would be introduced owing to the attack time and decay times of reference burst signal 304, i.e. because it is not at its full amplitude during its first and last cycles.

The value of digital chroma signal I is sampled and stored by I burst latch 36 during the interval defined by burst gate pulse 310 in response to sample signal SI which includes I sampling pulse 312 shown in FIG. 4f. Similarly, the value of digital chroma signal Q is sampled and stored in Q burst latch 42 in response to sample signal SQ which includes Q sampling pulse 314 shown in FIG. 4g. Latches 36 and 42 are eight-bit parallel latches.

Sampling signal SI is developed by I burst strobe 34 shown in FIG. 7. Burst gate pulse 310 is applied to set input S of flip flop FF1 to apply a high logic level from output Q of FF1 to a first input of AND gate 102. At the next application of the I clock pulse to the second input of AND gate 102, I sampling pulse 312 is developed at the output of AND gate 102. That I sampling pulse is applied, after a suitable delay 104, to the reset input R of FF1 causing its Q output to become a low logic level. As a result, coincidence at the inputs of AND gate 102 is lost thereby terminating sampling pulse 312. A suitable delay is introduced, for example, by a plurality of inverters 104.

Q burst strobe 40 is of similar structure to that of I burst strobe 34 except that it responds to the Q clock signal to develop sampling pulse 314 of the SQ sampling signal shown in FIG. 4g.

As thus far described, a digital word representing the value of the +I chroma signal sample corresponding to the reference burst signal 304 during time interval 310 is stored in I burst latch 36, and a digital word representing the value of the +Q chroma signal sample at that time is stored in Q burst latch 42.

Thereafter, I burst squarer 38 receives the stored +I chroma reference sample from I burst latch 36, develops a digital word corresponding to the square thereof, and applies that squared +I reference sample to a first input of adder 46. Similarly, Q burst squarer 44 receives the value of the stored +Q chroma reference sample, develops the square thereof, and applies that squared +Q reference sample to a second input of adder 46. Adder 46 provides a digital word corresponding to the sum of the squared +I chroma reference sample and the squared +Q chroma reference sample to digital comparator 48.

It is noted that the square of an eight-bit word can be a sixteen-bit word. Thus squarers 38 and 44, adder 46 and comparator 48 can be sixteen-bit devices. But, lesser numbers of bits will provide sufficient resolution to satisfactorily control chroma gain. Therefore, only the eight most significant bits are employed and eight-bit devices are satisfactory.

Each of I burst squarer 38 and Q burst squarer 44 comprises, for example, a read only memory (ROM) having 256 addressable registers each of which stores an eight-bit digital word corresponding to the eight most significant bits of the square of its address. The +I and +Q digital chroma reference samples are applied to the address inputs of the respective I and Q ROMs 38 and 44 causing each ROM to produce at its output a digital word whose value represents the square of the chroma reference sample applied as the register address.

Digital magnitude comparator 48 receives a chroma reference word corresponding to a predetermined desired amplitude of the reference burst signal 304, for example, nominally 20 IRE units zero-to-peak in an NTSC TV system in which one volt peak-to-peak corresponds to 140 IRE units. The chroma reference word is compared to the eight most significant bits of the squared chroma reference sum produced by adder 46. The chroma reference word value is responsive, at least in part, to a user adjustment for color level. Comparator 48 produces an automatic chroma control signal E which indicates departure of the squared chroma reference sum value from the predetermined chroma reference word value.

In simplest form, control signal E is a two-bit parallel word having, for example, the value 00 indicating no departure, 10 indicating that the squared chroma reference sum value exceeds that of the chroma reference word value, and 01 indicating that the chroma reference word value exceeds the squared chroma reference sum value. Microprocessor 120 in chroma amplifier and peaker 28 (FIG. 5) responds to these two flag bits by incrementing or decrementing the scaling factor each time a comparison is made by digital comparator 48, e.g., at the horizontal line rate 1H or at the vertical field rate.

Alternatively, automatic chroma control signal E can be an eight-bit word representing the value of the difference between the squared chroma reference sum value and the chroma reference word value. In this case, microprocessor 120 calculates the required scaling factor and adjusts the scaling factor table for RAM 114 to substantially eliminate the amplitude deviation of the chroma reference signal. I.e. microprocessor 120 causes RAM 114 to be loaded with a scaling factor table which makes the range of possible values of chroma samples C correspond to a predetermined range of values.

In a further alternative embodiment shown in FIG. 8, microprocessor 120' directly receives the chroma reference word value and the values of the I and Q chroma reference samples stored in I burst latch 36 and in Q burst latch 42, respectively. Microprocessor 120', in addition to the operations previously described, performs the squaring operation described in relation to I burst squarer 38 and Q burst squarer 44, the addition operation described in relation to adder 46, and the magnitude comparison described in relation to digital comparator 48.

The foregoing automatic chroma control arrangement is particularly advantageous in a digital television receiver in which tint control is obtained by adjusting the phase of the sampling clock $4f_{sc}$ relative to the phase of the color subcarrier signal 304. Chroma reference burst signal 304 shown in FIG. 4a is a sinusoidal signal mathematically representable as A COS (wt) wherein A is the peak amplitude of the sinusoid. Chroma reference burst signal 304 is sampled at a first phase point X corresponding to the I value and at a second point removed 90° therefrom, i.e. $Y = X + 90°$ corresponding to the Q value. The operation of latches 36 and 42, burst squarers 38 and 44, and adder 46 provides a chroma reference sum digital word representing $$SUM = A^2 \cos^2 X + A^2 \cos^2 (X+90°) \qquad [1]$$

in which X indicates the phase sampling point, for example, 57°. Equation 1 mathematically reduces to $$SUM = A^2[\cos^2 X + \sin^2 X] = A^2. \quad [2]$$

It is noted that the digital value of the squared reference chroma sum produced by adder 46 is responsive to the amplitude of the chroma reference burst signal 304 and is unaffected by the particular phase angle X at which chroma reference burst signal 304 is sampled. Therefore, tint control accomplished by adjusting the phase angle of the sampling signal $4f_{sc}$ relative to the phase of the color burst reference signal 304 will not disturb operation of the automatic chroma control arrangement of the present invention.

FIG. 9 shows an arrangement in which I burst squarer 38' and Q burst squarer 44' employ a single ROM 140 in place of the two separate ROMs 38 and 44 described above. I burst latch 36' is an eight-bit parallel latch which stores the I reference sample applied to its input in response to pulse 312 of sampling signal SI which is applied to its strobe terminal ST. Latch 36' supplies the stored word at its output terminal in response to pulse 320 of timing signal T1, shown in FIG. 3c, applied to its output enable terminal OE. Eight-bit parallel Q burst latch 42' stores a Q reference sample in response to pulse 314 of sampling signal SQ which is applied to its strobe terminal ST and provides the stored Q reference sample at its output terminal in response to pulse 322 of signal T2, shown in FIG. 3d, applied to its output enable terminal OE.

ROM 140 has 256 addressable registers each of which stores an eight-bit digital word corresponding to the eight most significant bits of the square of its address. In the interval defined by pulse 320 of signal T1, ROM 140 receives the stored I reference sample and develops the square thereof which is stored in I-squared latch 142. Thereafter, during the interval defined by pulse 322 of signal T2, ROM 140 receives the stored Q reference sample and produces the square thereof which is stored in Q-squared latch 144. The squared I reference sample stored in I-squared latch 142 is applied to a first input of eight-bit parallel adder 46 and the squared Q reference sample stored in Q-squared latch 144 is applied to a second input thereof. The sum developed at the output of adder 46 is applied to latch 47 in which it is stored during the interval defined by pulse 324 of signal T3, shown in FIG. 3e.

Pulses 320, 322 and 324 may be developed, for example, by appropriate delays referenced, to horizontal synchronizing pulse 302 or to the burst gate pulse 310. These delays are conveniently realized by counting down sampling clock $4f_{sc}$. The order in which pulses 320 and 322 are developed is immaterial, however, pulse 324 must be developed thereafter to control latch 47. This arrangement prevents erroneous sums developed by adder 46 during the time sequencing of ROM 140 by T1 and T2 from being supplied to comparator 48.

Figure 10:
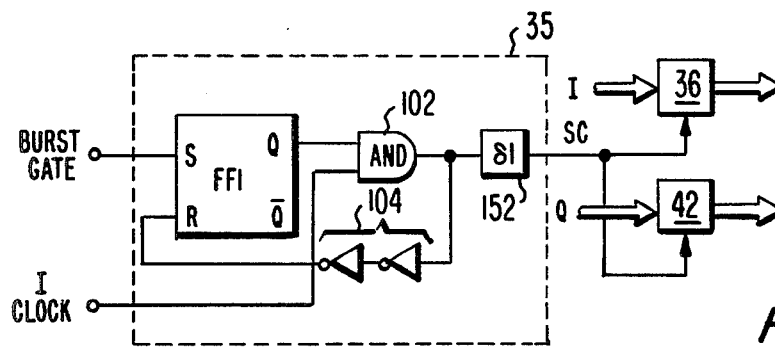

FIG. 10 shows a modification in which I burst strobe 34 and Q burst strobe 40 are replaced by strobe generator 35. Flip flop FF1, AND gate 102 and delay elements 104 produce a pulse at the output of AND gate 102 as described above in relation to FIG. 7. That pulse is delayed in time by delay device 152 to produce common sampling signal SC shown in FIG. 4j. Delay interval δ1 is selected so that the single pulse of sampling signal SC occurs at a time when both the I samples and Q samples shown in FIG. 4h and 4i are present and unchanging. Thus, sampling signal SC can be applied to both I burst latch 36 and Q burst latch 42 to sample both the I and Q reference signals simultaneously.

Figure 11:
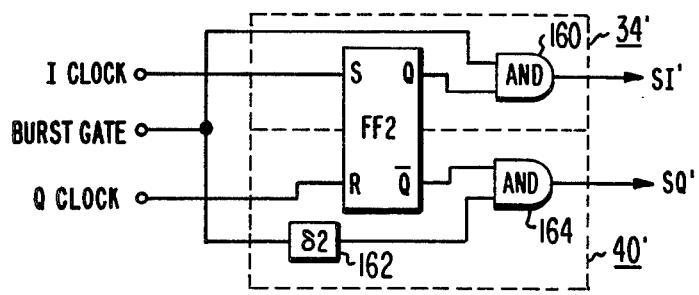
Figure 12:
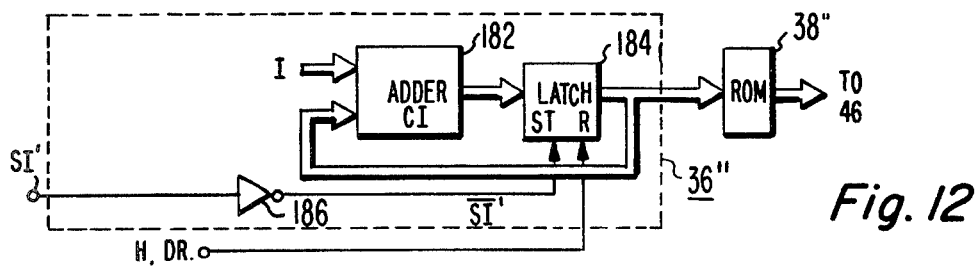

FIGS. 11 and 12 show a modification in which a plurality of I reference samples and Q reference samples are taken and an average value for each is determined. This arrangment advantageously reduces the effect of any errors introduced by random deviations which might be present in any particular sample of the chroma reference burst signal 304 caused, for example, by noise.

Sampling pulses SI' and SQ' shown in FIGS. 4k and 4m are developed by the arrangement shown in FIG. 11. The I clock signal and the Q clock signal are respectively applied to set input S and reset input R of flip flop FF2 to produce out-of-phase clock signals at the outputs Q and $\overline{Q}$ thereof. The clocking signal developed at output Q of FF2 is passed by AND gate 160 to become sampling signal SI' during the time interval when burst gate pulse 310 is applied to the second input of AND gate 160. Similarly, the clocking signal at the $\overline{Q}$ output of FF2 is passed by AND gate 164 to develop sampling signal SQ' during a time interval of equal duration to that of burst gate pulse 310. Delay device 162 is interposed to delay application of burst gate pulse 310 to the input of AND gate 164. Delay device 162 is provided so that an equal number of I reference samples and Q reference samples will be obtained, e.g., four samples. Delay interval δ2 is selected to be of sufficient duration to avoid generation of a sampling pulse in sampling signal SQ' during the interval δ2 immediately following the rising edge of burst gate pulse 310, as shown in FIG. 4m.

FIG. 12 shows modified I burst latch 36" which, in addition to latching the I chroma reference sample, receives a plurality of I chroma reference samples and develops a digital word representative of the average of those samples. To that end, latch 184 initially stores a zero value to which it has been a reset by horizontal drive signal H.DR. which is applied to its reset input R in response to horizontal synchronizing pulse 302. A first I chroma reference sample is applied to an input of parallel adder 182. Adder 182 produces a digital word equal to the sum of the digital words applied to its inputs from I sample demodulator 30 and latch 184. This sum is thereafter stored by latch 184 in response to inverted sampling signal $\overline{SI'}$ provided to its strobe terminal ST by inverter 186. Thereafter, a second I reference sample is added to the then present sum stored in latch 184 by adder 182. This new sum is then stored by latch 184 in response to $\overline{SI'}$, replacing the previous contents thereof. This process repeats until the sum of a predetermined number of I reference samples is accumulated and stored in latch 184. In this example, four samples are accumulated and stored in latch 184 corresponding to the four cycles in sampling signal SI' shown in FIG. 4k.

Similarly, Q burst latch 42 is replaced by structure identical to that of latch 36' but which receives Q reference samples and sampling signal SQ'.

When four samples of an eight-bit word are summed, the sum will include up to ten bits. For full resolution, adder 182 is an ten-bit parallel adder and latch 184 is an ten-bit parallel latch. Satisfactory accuracy is obtained, however, when an eight-bit word is supplied to ROM 38". This is conveniently accomplished by using the eight most significant bits from latch 184. Fortuitously, when four samples are to be averaged, discarding the two least signficant bits of the word stored in latch 184 has the same effect as shifting to the right by two bit positions which is equivalent to dividing by four. Therefore, the eight-bit word supplied to ROM 38″ is the average of the four I chroma samples.

It is noted that in employing the average value of a plurality of chroma reference samples, it is not necessary that the division operation necessary to determine a true average be performed as a separate operation. For example, each of the addressable registers in ROM 38″ can be loaded with a digital word corresponding to the square of its address divided by the square of the number of samples taken during the averaging operation. E.g., where four samples are to be taken and the two least significant bits of the accumulated sample sum are not discarded, the squared addresses would be divided by 16 and the quotient thereof loaded into the respective registers of ROM 38″. Alternatively, the same end could be achieved by increasing the value of the chroma reference word applied to digital comparator 48 by a multiplying factor equal the square of the number of samples averaged.

It is further noted that the sign bit, if any, associated with the I reference samples stored in latch 36 of FIG. 1 or accumulated in latch 184 of FIG. 12 can be disregarded. This is so because those latched samples must be squared before they are applied to adder 46, and $(+I)^2 = (-I)^2$.

Modifications to the above described embodiments are contemplated to be within the scope of the present invention which is limited only by the claims following. For example, in a color signal processor in which demodulators 30 and 32 produce samples at a $2 \times f_{sc}$ rate (i.e. +I, −I, +Q, and −Q samples), twice as many samples are obtained in a given time interval as would be possible by sampling only one polarity of the I chroma reference signal. Thus, sampling signals SI′ and SQ′ can be modified to include eight pulses to cause eight I and eight Q reference samples to be averaged within four cycles of chroma reference burst signal 304.

The digital chroma control apparatus described herein may be employed in conjunction with an analog gain controlling device. To this end, control signal E developed by digital comparator 48 of FIG. 1 is converted to an analog gain control signal by a digital-to-analog converter (not shown). The analog gain control signal is applied to at least one of tuner 12, IF processor 14, and video detector 16 which include conventional gain varying arrangements such as those found in commercially available television receivers.

In addition, it is satisfactory that the scaling of the digital signals, performed by chroma amplifier and peaker 28 in the embodiment described herein, be performed by ADC 24. ADC 24 includes a reference voltage source (not shown) to which the analog baseband composite video signal is compared. The range of input voltages applied to ADC 24 to obtain the full eight-bit digital range of its digital output word is directly dependent upon the magnitude of that reference voltage. I.e. the scaling factor of ADC 24 directly depends upon its reference voltage.

To the end of providing controllable scaling by ADC 24, automatic chroma control signal E developed by digital magnitude comparator 48 is applied via digital data bus 62 (shown in phantom) to the reference voltage source of ADC 24. Since control signal E is a digital word representing the departure or error in the chroma signal level, it can be applied to produce an analog voltage which is employed as all or part of the reference voltage of ADC 24. Control signal E is poled to increase the reference voltage of ADC 24 when the analog signal is too large to thereby decrease the scaling factor, and vice versa. This modification performs adjustment of the digital signal levels of luminance Y and chrominance C digital signals as well as of the digital signals supplied to deflection processor 60.

By way of further example, it is equally satisfactory to employ the squaring arrangement shown in FIG. 9 in conjunction with the averaging latch arrangement 36′ shown in FIG. 12. Furthermore, the squaring operation (e.g., as performed by ROM 38″ in FIG. 12 or the equivalent embodiment shown in FIG. 9) can be performed directly on the I chroma reference samples and the averaging operation performed thereafter by averaging arrangement 36′. It appears, however, that errors introduced by random effects such as noise are less pronounced in the preferred arrangement in which the averaging operation preceeds the squaring operation.

Further, pulses 312 and 314 of sampling signals SI and SQ of FIGS. 4f and 4g may be developed at other times during the time interval defined by burst gate pulse 310 of FIG. 4e. Any delays which maintain the proper relation between pulses 312 and 314 and the phase of the color reference burst signal 304 are satisfactory.

Squarers 38 and 44 may each employ an eight bit multiplier, such as the TDC 1008J commercially available from TRW Inc., having the stored I and Q values applied to both of their inputs, respectively.

What is claimed is:

1. In a television receiver including a source of digital chroma signals having a chroma reference burst component, a digital chroma gain control apparatus comprising:

gain controlled processing means coupled to said source of digital chroma signals, including means for producing a chroma signal scaled in response to a chroma control signal;

sampling means responsive to the chroma reference burst component of said digital chroma signals for producing first and second digital reference signals, said first and second digital reference signals being in quadrature phase relation and having magnitudes related to said digital chroma reference burst component;

calculating means for developing a digital sum signal corresponding to successive sums of the respective squares of the magnitudes of said first and second digital reference signals; and control means for developing said chroma control signal in response to said digital sum signal departing from a predetermined value, said control means developing said chroma control signal having a value for adjusting the gain of said processing means to cause said digital chroma signals to have the magnitude producing said digital sum signal of said predetermined value.

2. The apparatus of claim 1 wherein said calculating means comprises:

first and second squaring means for producing first and second squared digital signals in response to said first and second digital chroma reference signal values, respectively; and adding means for adding said first and second squared digital signals to produce said digital sum signal.

3. The apparatus of claim 2 wherein said first and second squaring means includes at least one read only memory having an address input port coupled for applying said first and second digital reference signal values.

4. The apparatus of claim 1 wherein said sampling means comprises:
   first and second latch means for storing said first and second digital reference signals respectively in response to a strobing signal;
   clocking means for developing a clocking signal in predetermined phase relation to the chroma reference burst component of said digital chroma signals;
   gating means for developing a burst gating signal when said chroma reference burst component is present; and
   strobing means for developing said strobing signal in response to said clocking signal and said burst gating signal.

5. The apparatus of claim 4 wherein said clocking means develops said clocking signal including first and second clocking signal components in phase quadrature with respect to the phase of said chroma reference burst component, and wherein said strobing means develops said strobing signal including respective first and second strobing components in response to said first and second clocking signal components, respectively.

6. The apparatus of claim 4 wherein said sampling means further comprises:
   averaging means interposed before said first and second latch means to receive first and second digital chroma reference signal samples and responsive to said strobing signal for producing first and second averaged digital signals representative of at least the sum of a plurality of samples of said first and second digital chroma reference signals, said first and second averaged digital signals being stored in said first and second latch means, respectively, in response to said strobing signal.

7. The apparatus of claim 6 wherein said calculating means includes a read only memory (ROM) having a plurality of addressable registers, each said register storing a digital word corresponding to the square of its address divided by the number of said plurality of samples, said first and second averaged digital signals corresponding to the addresses of said registers.

8. The apparatus of claim 1 wherein said control means comprises:
   a source of a digital signal representative of said predetermined value; and
   digital comparison means receiving said digital sum signal at a first input port thereof and receiving said digital signal representative of said predetermined value at a second input port thereof, for supplying said chroma control signal at an output port thereof.

9. The apparatus of claim 8 wherein said chroma control signal supplied at the output port of said digital comparison means is a digital chroma control signal.

10. The apparatus of claim 9 wherein said digital comparison means develops said digital chroma control signal in a format indicating the sense in which said digital sum signal departs from said predetermined value.

11. The apparatus of claim 10 wherein said digital comparison means develops said digital chroma control signal in a format further indicating the degree to which said digital sum signal departs from said predetermined value.

12. In a television receiver including a source of digital chroma signals having a chroma reference burst component, a digital chroma gain control apparatus comprising:
   processing means responsive to a digital chroma control signal for scaling the magnitude of said digital chroma signals to produce scaled digital chroma signals;
   sampling means responsive to the chroma reference burst component of said digital chroma signals for producing first and second digital chroma reference signals, said second digital chroma reference signal being produced from said chroma reference burst component in quadrature to said first digital chroma reference signal;
   calculating means for developing a digital sum signal representative of the magnitude of the sum of the respective squares of the magnitudes of said first and second digital chroma reference signals; and
   control means for developing said digital chroma control signal in response to said digital sum signal departing from a predetermined value, said control means developing said digital chroma control signal having a value for adjusting said scaling of said processing means to cause said scaled digital chroma signals to have the magnitude producing said digital sum signal of said predetermined value.

13. A method for controlling the magnitude of a digitized chroma signal having a burst signal component in a television receiver so as to cause said digitized chroma signal to have a predetermined signal level comprising the steps of:
   (a) sampling the respective magnitudes of quadrature components of said digitized chroma signal having said burst signal component;
   (b) storing the respective magnitudes of said sampled quadrature components of said burst signal component;
   (c) squaring the respective magnitudes of said stored sampled quadrature components;
   (d) summing said squared respective magnitudes of said stored sampled quadrature components;
   (e) comparing said sum to a digitized number representative of said predetermined signal level to develop an error value;
   (f) generating from said error value a scaling factor for said digitized chroma signal; and
   (g) scaling said digitized chroma signal in accordance with said scaling factor to cause said digitized chroma signal to have said predetermined signal level.

14. The method of claim 13 wherein the step (a) further includes the steps of:
   (h) sampling the respective magnitudes of at least one additional sample of each of the quadrature components of said digitized chroma signal having said burst signal components;
   (i) adding each said additional sample of said quadrature components to the respective first samples thereof obtained in step (a); and
   (j) supplying the respective sums produced in step (i) as the respective magnitudes of said sampled quadrature components of said burst signal component employed in step (b).

15. The method of claim 14 wherein the step (c) comprises the steps of:
   (k) addressing a memory loaded with digital values representative of the squares of respective addresses by applying said respective magnitudes of said stored sampled quadrature components to said memory as said respective addresses; and
   (l) reading the digital values in said respective addressed registers as said squared respective magnitudes employed in step (d).

* * * * *